US012060143B2

(12) United States Patent
Janeczko et al.

(10) Patent No.: US 12,060,143 B2
(45) Date of Patent: Aug. 13, 2024

(54) ELECTRIC MARINE PROPULSION SYSTEM AND CONTROL METHOD

(71) Applicant: Brunswick Corporation, Mettawa, IL (US)

(72) Inventors: Jason J. Janeczko, Fond du Lac, WI (US); Jared D. Kalnins, Neenah, WI (US)

(73) Assignee: Brunswick Corporation, Mettawa, IL (US)

( * ) Notice: Subject to any disclaimer, the term of this patent is extended or adjusted under 35 U.S.C. 154(b) by 376 days.

(21) Appl. No.: 17/574,303

(22) Filed: Jan. 12, 2022

(65) Prior Publication Data

US 2023/0219675 A1    Jul. 13, 2023

(51) Int. Cl.
*B63H 21/17* (2006.01)
*B60L 58/12* (2019.01)
*B63H 21/21* (2006.01)

(52) U.S. Cl.
CPC .............. *B63H 21/17* (2013.01); *B60L 58/12* (2019.02); *B63H 21/21* (2013.01); *B60L 2240/12* (2013.01); *B60L 2240/421* (2013.01); *B60L 2240/423* (2013.01); *B60L 2240/429* (2013.01); *B60L 2240/547* (2013.01); *B63H 2021/216* (2013.01)

(58) Field of Classification Search
CPC .. B63H 21/17; B63H 21/21; B63H 2021/216; B60L 58/12; B60L 2240/12; B60L 2240/421; B60L 2240/423; B60L 2240/429; B60L 2240/547; B60L 2240/216
See application file for complete search history.

(56) References Cited

U.S. PATENT DOCUMENTS

| 6,507,164 B1 | 1/2003 | Healey et al. |
| 6,652,330 B1 | 11/2003 | Wasilewski |
| 6,885,919 B1 | 4/2005 | Wyant et al. |

(Continued)

FOREIGN PATENT DOCUMENTS

| CN | 108431712 B | 8/2021 |
| DE | 102018116472 A1 | 1/2020 |

(Continued)

OTHER PUBLICATIONS

Torqeedo GmbH, Travel 503, 1003 S/L, 1003, 1103 CS/CL, https://media.torqeedo.com/downloads/manuals/torqeedo-Travel-manual-DE-EN.pdf, p. 82, accessed Jan. 4, 2022.

(Continued)

*Primary Examiner* — Stephen P Avila
(74) *Attorney, Agent, or Firm* — Andrus Intellectual Property Law, LLP (57) ABSTRACT

A method of controlling an electric marine propulsion system to propel a marine vessel includes receiving a user-set time, determining a time remaining based on the user-set time, and identifying a battery charge level of a power storage system on the marine vessel. A required battery power is then determined based on the time remaining and the battery charge level, and then an output limit is determined based on the required battery power to enable propelling the marine vessel for the user-set time without recharging the power storage system. The propulsion system is automatically controlled so as not to exceed the output limit.

22 Claims, 7 Drawing Sheets

(56) References Cited

U.S. PATENT DOCUMENTS

| | | |
|---|---|---|
| 6,902,446 B1 | 6/2005 | Healey |
| 7,218,118 B1 | 5/2007 | Gonring |
| 7,385,365 B2 | 6/2008 | Feick |
| 9,975,619 B1* | 5/2018 | Gonring .................... H02P 9/48 |
| 2012/0101671 A1* | 4/2012 | Caouette ................ B63H 21/21 |
| | | 180/65.265 |
| 2014/0200756 A1 | 7/2014 | Sisk |

FOREIGN PATENT DOCUMENTS

| | | |
|---|---|---|
| DE | 102012214962 A1 | 3/2022 |
| EP | 2996934 B1 | 8/2017 |

OTHER PUBLICATIONS

Guangdon ePropulsion Technology Limited, Spirit 1.0 Evo User Manual, https://media.torqeedo.com/downloads/manuals/torqeedo-Travel-manual-DE-EN.pdf, p. 32, accessed Jan. 4, 2022.
EP 23151219, Extended European Search Report, dated Jun. 21, 2023, 24 pages.

* cited by examiner

ELECTRIC MARINE PROPULSION SYSTEM AND CONTROL METHOD

FIELD

The present disclosure generally relates to marine propulsions systems, and more particularly to electric marine propulsion systems having electric motors and methods for controlling power utilization thereof.

BACKGROUND

The following U.S. Patents provide background information and are incorporated herein by reference, in entirety.

U.S. Pat. No. 6,507,164 discloses a trolling motor having current based power management including: an electric motor; a motor controller having an output for providing voltage to the motor; and a current sensor for measuring the electrical current flowing through the motor. Upon determining that the trolling motor has been operating above its continuous duty limit for a predetermined period of time, the motor controller begins reducing the voltage output to the motor until reaching an acceptable output voltage. In another embodiment, the controller is operated in three distinct modes with three distinct sets of operating parameters, namely: a normal mode wherein the output is set to a commanded level; a current limit mode wherein the output is set to a safe, predetermined level; and a transitional mode wherein the output is incrementally changed from the predetermined level to the commanded level.

U.S. Pat. No. 6,652,330 discloses a method for controlling the electrical system of a marine vessel which comprises the steps of measuring a battery potential, comparing the battery potential to a threshold voltage magnitude, and then disconnecting one or more of a plurality of electrical power consuming devices when the voltage potential is less than the threshold voltage magnitude. This is done to avoid the deleterious condition wherein an engine of the marine vessel is operating at idle speed and attempting to charge the battery while a plurality of electrical power consuming devices are operating and drawing sufficient current from the alternator to prevent the proper charging of the battery. In these circumstances, the battery potential can actually be depleted as the battery attempts to provide the additional required electrical current for the loads.

U.S. Pat. No. 6,885,919 discloses a process is provided by which the operator of a marine vessel can invoke the operation of a computer program that investigates various alternatives that can improve the range of the marine vessel. The distance between the current location of the marine vessel and a desired waypoint is determined and compared to a range of the marine vessel which is determined as a function of available fuel, vessel speed, fuel usage rate, and engine speed. The computer program investigates the results that would be achieved, theoretically, from a change in engine speed. Both increases and decreases in engine speed are reviewed and additional theoretical ranges are calculated as a function of those new engine speeds. The operator of the marine vessel is informed when an advantageous change in engine speed is determined.

U.S. Pat. No. 6,902,446 discloses a DC motor having a motor housing and a motor controller housed within the motor housing. In a preferred embodiment the heat producing components of the motor controller are in thermal communication with the housing such that the majority of the heat produced by such components will be readily conducted to the environment in which the motor is operating. When incorporated into a trolling motor, the motor housing of the present invention will be submerged so that controller produced heat will be dissipated into the water in which the trolling motor is operated.

U.S. Pat. No. 7,218,118 discloses a method for monitoring the condition of a battery of a marine propulsion system provides the measuring of a voltage characteristic of the battery, comparing the voltage characteristic to a preselected threshold value, and evaluating the condition of the battery as a function of the relative magnitudes of the voltage characteristic and the threshold value. The voltage characteristic of the battery is measured subsequent to a connection event when a connection relationship between the battery and an electrical load is changed. The electrical load is typically a starter motor which is connected in torque transmitting relation with an internal combustion engine. The voltage characteristic is preferably measured at its minimum value during the inrush current episode immediately prior to cranking the internal combustion engine shaft to start the engine.

U.S. Pat. No. 7,385,365 discloses a method for error detection of a brushless electric motor, where at least one first motor parameter is measured or determined, and a second, estimated motor parameter is estimated on the basis of the first motor parameter. The second, estimated motor parameter is compared to a second, measured or determined motor parameter. An error of the electric motor can be found out according to the comparison.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method of controlling an electric marine propulsion system to propel a marine vessel includes receiving a user-set time, determining a time remaining based on the user-set time, and identifying a battery charge level of a power storage system on the marine vessel. A required battery power is then determined based on the time remaining and the battery charge level, and then an output limit is determined based on the required battery power to enable propelling the marine vessel for the user-set time without recharging the power storage system. The propulsion system is automatically controlled so as not to exceed the output limit.

In one example, the output limit includes a maximum motor torque for an electric motor in the propulsion system and controlling the propulsion system includes controlling the electric motor so as not to exceed the maximum motor torque.

In one example, the output limit includes a maximum motor RPM for an electric motor in the propulsion system and controlling the propulsion system includes controlling the electric motor so as not to exceed the maximum motor RPM.

In one example, the output limit includes a maximum motor current consumed by an electric motor in the propulsion system and controlling the propulsion system includes controlling the electric motor so as not to exceed the maximum motor current.

In one example, the output limit includes a maximum motor power consumed by an electric motor in the propulsion system and controlling the propulsion system includes controlling the electric motor so as not to exceed the maximum motor power.

In one example, the output limit includes a maximum vessel speed and controlling the propulsion system includes controlling an electric motor in the propulsion system such that a current vessel speed does not exceed the maximum vessel speed.

In one example, the output limit includes a maximum helm demand and controlling the propulsion system so as not to exceed the output limit includes limiting a demand instruction to the maximum helm demand.

In one example, the method further includes receiving a user input to engage a time control mode prior to determining the output limit.

In one example, the method further includes receiving a user input to engage a time control mode and determining a threshold battery charge level based on the user-set time, and only engaging the time control mode if the required battery power is greater than the threshold battery charge level.

In one example, the method further includes receiving a non-motor power consumption total representing a total power draw from the power storage system minus a power draw by the motor, determining the output limit includes determining a required motor power based on the non-motor power consumption total, and calculating the output limit based on the required motor power.

In a further example, a plant model is utilized to calculate the output limit based on the required motor power.

In a further example, the plant model is a motor-power-to-torque plant model configured to calculate the output limit as a maximum motor torque based on the required motor power.

An electric marine propulsion system configured to propel a marine vessel includes a power storage system, at least one electric motor powered by the power storage system and configured to rotate a propulsor to propel the marine vessel and a control system. The control system is configured to receive a user-set time, determine a time remaining based on the user-set time, and identify a battery charge level of a power storage system on the marine vessel. The control system determines a required battery power based on the time remaining and the battery charge level, and then determines an output limit based on the required battery power to enable propelling the marine vessel for the user-set time without recharging the power storage system. The at least one electric motor is automatically controlled so as not to exceed the output limit.

In example embodiments, the system is configured to perform the method step examples listed above.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

The present inventors have recognized that electric marine propulsion poses additional challenges and safety concerns as compared to electric propulsion for land vehicles. One such challenge that is magnified for marine propulsion is that of battery range and effectively managing range anxiety and battery utilization for users of marine vehicles. Being stranded in a body of water due to insufficient battery is concerning for a user of a marine vessel, and tends to be more so than for a user of a land vehicle because the user cannot easily exit the vessel and may not be in a situation to easily access help. For this reason, users report having increased anxiety when operating electric marine propulsion systems, and particularly may have heightened concerns regarding maintaining sufficient battery power to reach their destination and/or reach shore. Accordingly, the inventors developed the disclosed system and method that assists the user in utilizing battery power for an electric marine propulsion system that includes functions and safety features to prevent a user from inadvertently or unknowingly running it out of battery power during operation.

Based on recognition of the foregoing problems and challenges in the relevant art, the inventors developed the disclosed control system and method for electric marine propulsion to enable the marine vessel to be propelled for a user-set time without recharging the power storage system. For example, the output limit may be determined as the maximum value at which the motor can be operated for the user-set time, or remaining portion of the user-set time. The disclosed system and method are configured to facilitate a user input of a desired time, such as a specified duration or a specified end-time of day, and to determine and maintain an output limit based on the user input to enable the propulsion system to continue propelling the marine vessel for the user-set time. In one embodiment, the output limit is determined based on the user-set time, or a remaining time where the elapsed time is subtracted from the user-set time, a battery charge level of the power storage system on the marine vessel, and a current power utilization value. In one embodiment, a required battery power may be calculated based on the time remaining and the battery charge level, and then a required motor power may be calculated based on the required battery power and the current power utilization.

For example, the current power utilization may be a non-motor power consumption value representing a total power consumption by all devices on the marine vessel except for the motor—e.g., a total power draw from the marine battery minus the power draw of the motor. This way the power consumed by other devices on the marine vessel are accounted for, and the remaining power can be allocated for use by the motor. The output limit is then calculated accordingly so as to provide a control limit for controlling the motor to enable the marine vessel to travel the user-set time without running out of battery power or needed to recharge.

In various embodiments, the output limit may be effectuated as a maximum value that sets a limit for the rate of power consumption by the motor. The output limit may be effectuated as a maximum motor torque, a maximum motor speed (RPM), a maximum motor current or motor power consumed by one or more electric motors in the propulsion system, a maximum demand instruction permitted, a maximum vessel speed, or the like. In various embodiments, the output limit may be automatically effectuated by the control system on the marine vessel such that the propulsion system, and particularly the motor, is controlled so as not to exceed the output limit.

For example, the one or more electric motors or the power delivered thereto may be limited by the control system to enable the marine vessel to travel the user-set time. For example, the control system may be configured to automatically limit the motor torque output or the motor RPM to a maximum determined output limit, which is a cap on the motor output effectuated based on user demand. Thus, where user demand (such as demand percent based on helm lever position) is high, only a portion of the user demand within the output limit may be effectuated to conserve battery power as necessary. The system may be configured to generate an alert to the user when the user demand is exceeding the output limit to advise a user that only a portion of their demanded output from the motor is being effectuated to conserve battery power in the time control mode.

Figure 1:
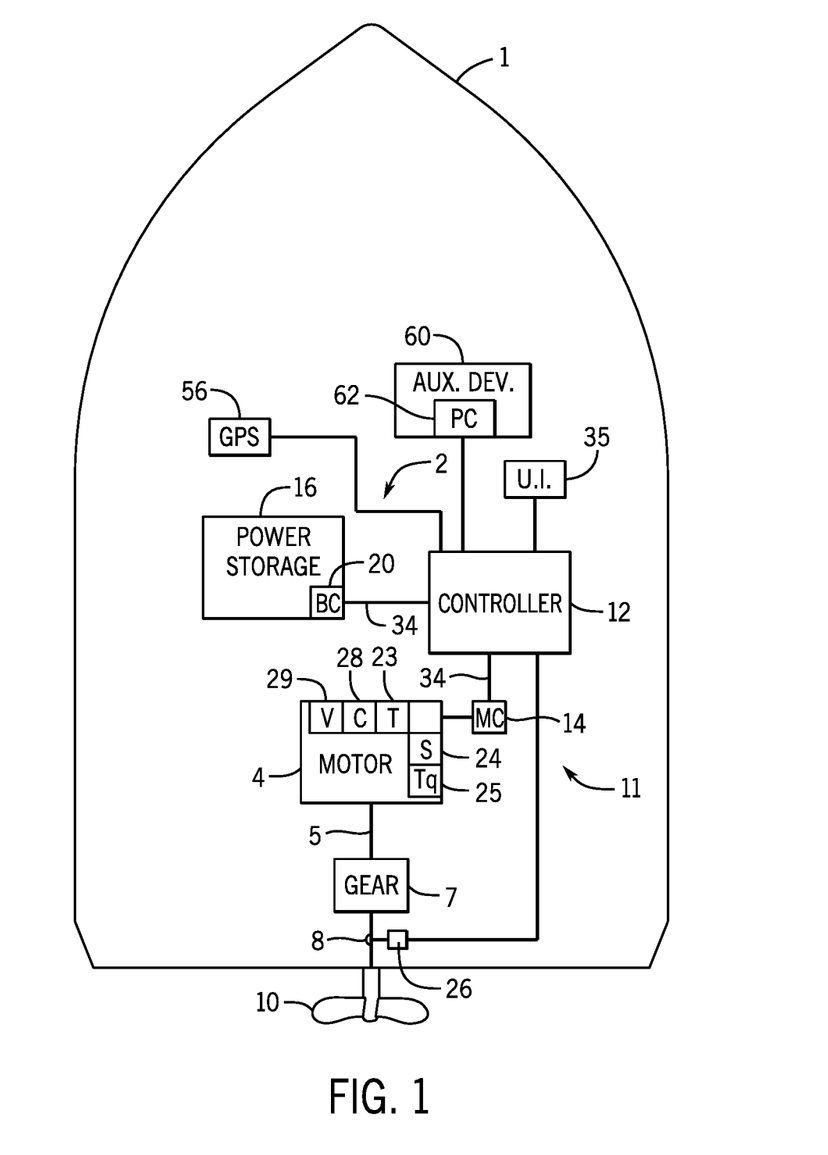
FIG. 1 is a schematic depiction of a marine vessel having an exemplary electric marine propulsion system in accordance with the present disclosure.
Figure 2:
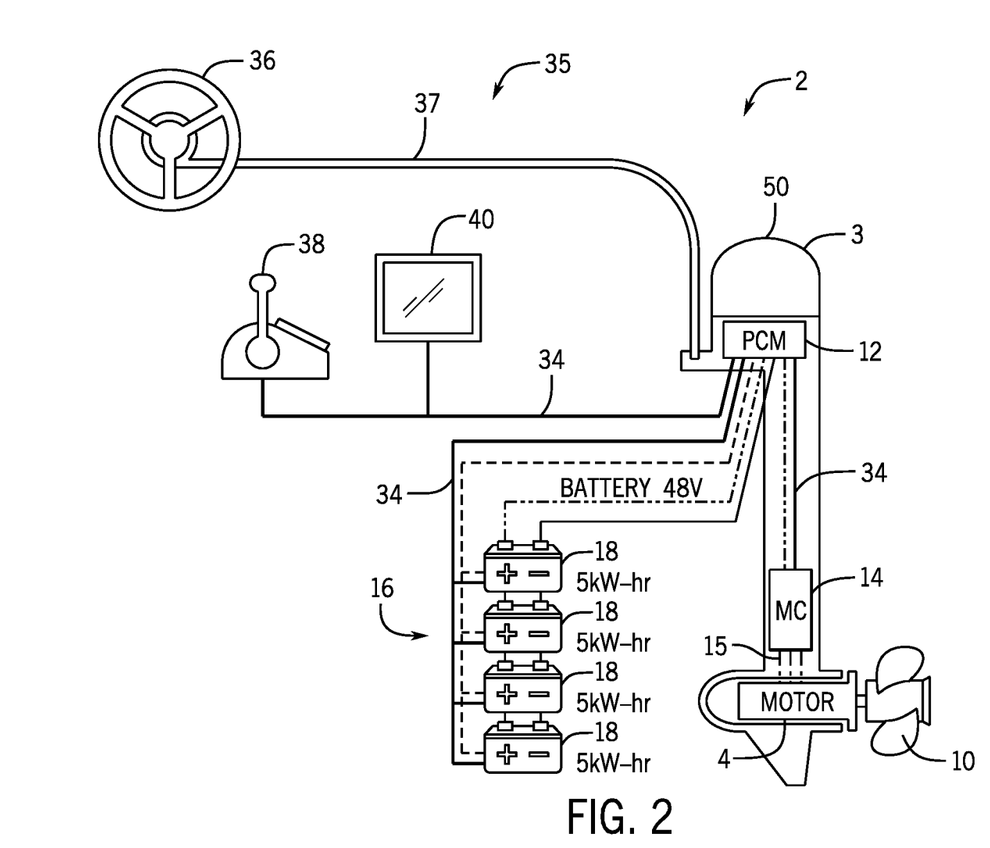
FIG. 2 is a schematic of another exemplary electric marine propulsion system in accordance with the present disclosure.

FIG. 1 depicts an exemplary embodiment of a marine vessel 1 having an electric marine propulsion system 2 configured to propel the marine vessel in a direction instructed by an operator via a steering control system, or by a guidance system configured to automatically control steering of the marine vessel to steer the vessel toward a predetermined location or global position. Referring also to FIG. 2, the electric propulsion system 2 includes at least one electric marine drive 3 having an electric motor 4 configured to propel the marine vessel 1 by rotating a propeller 10, as well as a power storage system 16, and a user interface system 35. In the depicted embodiment of FIG. 2, the electric marine propulsion system 2 includes an outboard marine drive 3 having an electric motor 4 housed therein, such as housed within the cowl 50 of the outboard marine drive. A person of ordinary skill in the art will understand in view of the present disclosure that the marine propulsion system 2 may include other types of electric marine drives 3, such as inboard drives or stern drives. The electric marine drive 3 is powered by the scalable storage device 16, such as including a bank of batteries 18.

The electric marine propulsion system 2 may include one or a plurality of electric marine drives 3, each comprising at least one electric motor 4 configured to rotate a propulsor, or propeller 10. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator in a known configuration.

The electric motor 4 is electrically connected to and powered by a power storage system 16. The power storage system 16 stores energy for powering the electric motor 4 and is rechargeable, such as by connection to shore power when the electric motor 4 is not in use. Various power storage devices and systems are known in the relevant art. The power storage system 16 may be a battery system including one or more batteries or banks of batteries. For example, the power storage system 16 may include one or more lithium-ion (LI) battery systems, each LI battery comprised of multiple battery cells. In other embodiments, the power storage system 16 may include one or more lead-acid batteries, fuel cells, flow batteries, ultracapacitors, and/or other devices capable of storing and outputting electric energy.

The electric motor 4 is operably connected to the propeller 10 and configured to rotate the propeller 10. As will be known to the ordinary skilled person in the relevant art, the propeller 10 may include one or more propellers, impellers, or other propulsor devices and that the term "propeller" may be used to refer to all such devices. In certain embodiments, such as that represented in FIG. 1, the electric motor 4 may be connected and configured to rotate the propeller 10 through a gear system 7 or a transmission. In such an embodiment, the gear system 7 translates rotation of the motor output shaft 5 to the propeller shaft 8 to adjust conversion of the rotation and/or to disconnect the propeller shaft 8 from the drive shaft 5, as is sometimes referred to in the art as a "neutral" position where rotation of the drive shaft 5 is not translated to the propeller shaft 8. Various gear systems 7, or transmissions, are well known in the relevant art. In other embodiments, the electric motor 4 may directly connect to the propeller shaft 8 such that rotation of the drive shaft 5 is directly transmitted to the propeller shaft 8 at a constant and fixed ratio.

The power storage system 16 may further include a battery controller 20 configured to monitor and/or control aspects of the power storage system 16. The battery controller 20 may further be configured to receive information from current, voltage, and/or other sensors within the power storage system 16, such as to receive information about the voltage, current, and temperature of each battery cell or group of battery cells within the power storage system 16. For example, the battery controller 20 may receive inputs from one or more sensors within the power storage system 16, such as one or more voltage, current, and temperature sensors within a housing for the power storage system 16. Voltage sensors may be configured to sense voltage within the battery (such as cell voltage sensors configured to sense the voltage of individual cells or groups of cells in a LI battery) and one or more temperature sensors may be configured to sense a temperature within a housing of the power storage device where one or more batteries or other storage elements are located. The battery controller 20 or other controller in the system is configured to calculate a charge level, such as a state of charge or a battery power level in watt hours or amp hours, of the power storage system 16.

A control system 11 controls the electric marine propulsion system 2, wherein the control system 11 may include a plurality of control devices configured to cooperate to provide the method of controlling the electric marine propulsion system described herein. For example, the control system 11 includes a central controller 12, the battery controller 20, and one or more motor controllers, trim controllers, steering controllers, etc. communicatively connected, such as by a communication bus. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Each controller may comprise a processor and a storage device, or memory, configured to store software and/or data utilized for controlling and or tracking operation of the electric propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 11 and peripheral devices.

Each electric motor 4 may be associated with a motor controller 14 configured to control power to the electric motor, such as to the stator winding thereof. The motor controller 14 is configured to control the function and output of the electric motor 4, such as controlling the torque outputted by the motor, the rotational speed of the motor 4, as well as the input current, voltage, and power supplied to and utilized by the motor 4. In one arrangement, the motor controller 14 controls the current delivered to the stator windings via the leads 15, which input electrical energy to the electric motor to induce and control rotation of the rotor.

In certain embodiments, various sensing devices 23-25, 26, and 28-29, may be configured to communicate with a local controller, such as the motor controller 14 or battery controller 20, and in other embodiments the sensors 23-25, 26, and 28-29 may communicate with the central controller 12 and one or more of the motor controller 14 and or battery controller 20 may be eliminated. A GPS system 55 may also be configured to determine a current global position of the vessel, track vessel position over time, and/or determine current vessel speed and direction of travel, and to provide such information to the controller 12. Alternatively or additionally, current vessel speed may be measured by a speed-over-water sensor such as a pitot tube or a paddle wheel and such information may be provided to the controller 12. Controllers 12, 14, 20 (and or the various sensors and systems) may be configured to communicate via a communication bus such as a CAN bus or a LIN bus, or by single dedicated communication links between controllers 12, 14, 20.

Sensors may be configured to sense the power, including the current and voltage, delivered to the motor 4. For example, a voltage sensor 29 may be configured to sense the input voltage to the motor 4 and a current sensor 28 may be configured to measure input current to the motor 4. Accordingly, power delivered to the motor 4 can be calculated and such value can be used for monitoring and controlling the electric propulsion system 2, including for monitoring and controlling the motor 4. In the depicted example, the current sensor 29 and voltage sensor 28 may be communicatively connected to the motor controller 14 to provide measurement of the voltage supplied to the motor and current supplied to the motor. The motor controller 14 is configured to provide appropriate current and or voltage to meet the demand for controlling the motor 4. For example, a demand input may be received at the motor controller 14 from the central controller 12, such as based on an operator demand at a helm input device, such as the throttle lever 38. In certain embodiments, the motor controller 14, voltage sensor 28, and current sensor 29 may be integrated into a housing of the electric motor 4, in other embodiments the motor controller 14 may be separately housed.

Various other sensors may be configured to measure and report parameters of the electric motor 4. For example, the electric motor 4 may include means for measuring and or determining the torque, rotation speed (motor speed), current, voltage, temperature, vibration, or any other parameter. In the depicted example, the electric motor 4 includes a temperature sensor 23 configured to sense a temperature of the motor 4, a speed sensor 24 configured to measure a rotational speed of the motor 4 (motor RPM), and a torque sensor 25 for measuring the torque output of the motor 4. A propeller speed sensor 26 may be configured to measure a rotational speed of the propeller 10. For example, the propeller speed sensor 26 and/or the motor speed sensor 24 may be a Hall Effect sensor or other rotation sensor, such as using capacitive or inductive measuring techniques. In certain embodiments, one or more of the parameters, such as the speed, torque, or power to the electric motor 4, may be calculated based on other measured parameters or characteristics. For example, the torque may be calculated based on power characteristics in relation to the rotation speed of the electric motor, for example.

The central controller 12, which in the embodiment shown in FIG. 2 is a propulsion control module (PCM), communicates with the motor controller 14 via communication link 34, such as a CAN bus. The controller also receives input from and/or communicates with one or more user interface devices in the user interface system 35 via the communication link, which in some embodiments may be the same communication link as utilized for communication between the controllers 12, 14, 20 or may be a separate communication link. The user interface devices in the exemplary embodiment include a throttle lever 38 and a display 40. In various embodiments, the display 40 may be, for example, part of an onboard management system, such as the VesselView™ by Mercury Marine of Fond du Lac, Wisconsin A steering wheel 36 is provided, which in some embodiments may also communicate with the controller 12 in order to effectuate steering control over the marine drive 3, which is well-known and typically referred to as steer-by-wire arrangements. In the depicted embodiment, the steering wheel 36 is a steer arrangement where the steering wheel 36 is connected to a steering actuator that steers the marine drive 3 by a steering cable 37. Other steer arrangements, such as various steer-by-wire arrangements, are well-known in the art and could alternatively be implemented.

The various parameters of the electric propulsion system are utilized for providing user-controlled or automatically effectuated vessel power control functionality appropriate for optimizing power usage. The system may be configured to control power usage by the electric propulsion system 2 to prevent running out of power prior to operating for the user-set time and to continue at least low speed propulsion of the marine vessel sufficient to complete the requested duration of operation. The system may be configured to operate in a variety of user-selectable power modes, including a time mode where the control system 11 operates to impose limits on motor output or power consumption enable the marine vessel to travel the user-set time without recharging the power storage system. For example, the output limit may be determined as the maximum value at which the motor can be operated for the user-set time, or remaining portion of the user-set time.

The power storage system 16 may further be configured to power auxiliary devices 60 on the marine vessel 1 that are not part of the propulsion system 2. For example, the auxiliary devices may include a bilge pump, cabin lights, a stereo system or other entertainment devices on the vessel, a water heater, a refrigerator, an air conditioner or other climate/comfort control devices on the vessel, communication systems, navigation systems, or the like. Some or all of these accessory devices are sometimes referred to as a "house load" and may consume a substantial amount of battery power.

The system may present the user with a plurality of power mode options selectable by a user, which may include options for a full power mode where the user has full power authority, a distance control mode where the system limits power usage in order to enable the vessel to travel a user-set distance on the remaining battery power, and a time control mode where the system limits power usage in order to enable the vessel to travel a user-set time on the remaining battery power. Power consumed by and/or supplied to the motor 4, and/or the electric marine drive 3 more generally, are then controlled according to the user's selected mode. Alternatively, the mode may be automatically selected and engaged by the control system 11, such as based on the charge level of the power storage system 16, the distance of the marine vessel from shore or from a predetermined location, the energy consumption history of the electric marine drive 3, and/or other factors.

Figure 3:
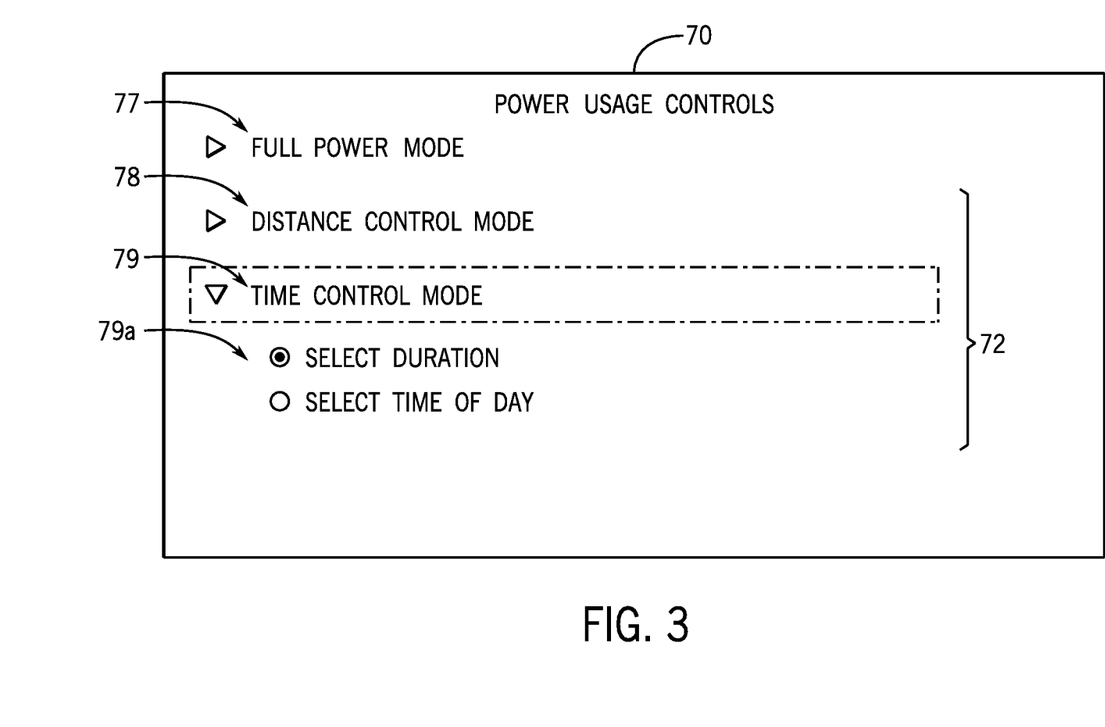
FIG. 3 is an exemplary display embodiment for mode selection in accordance with the present disclosure.

FIG. 3 depicts an exemplary user interface display 70, such as may be shown on the display device 40 of the user interface system 35. The user interface display 70 is configured to present a plurality of power mode options selectable by a user. In the depicted example, the power mode options 72 include a full power mode option 77 providing full power utilization control authority to the user, a distance control mode option 78 where the control system 11 acts to determine and/or impose an output limit to enable the marine vessel to travel the user-set distance without recharging the power storage system, and a time control mode option 79 where the control system 11 acts to determine and/or impose an output limit to enable the marine vessel to travel the user-set time period without recharging the power storage system.

In certain embodiments, the system may be further configured to allow a user to select and input various formats for the user-set distance or user-set times. In FIG. 3, upon selection of the time control mode option 79, the user is prompted to select a time format between a duration value (e.g. an amount of time of operation in hours and minutes) and a specified time of day until which the user wants to continue operating the marine vessel. In the example, format selections 79a enable a user to select a dial box to select an input format for the time selection between inputting a duration and selecting a time of day to designate the end time for operation on the current battery power (e.g., a time to recharge the battery). Upon such selection, the user interface may be configured to prompt a user to then input the selected information in an appropriate format based on the selection.

The propulsion system is then controlled to enable the marine vessel to travel the user-set time. Alternatively or additionally, the control system 11 may be configured to control power to one or more auxiliary devices in order to enable the marine vessel to travel the user-set time. The power consumption by some or all of the auxiliary devices may be controllable, such as by a power controller 62 associated with each controlled auxiliary device or a group of auxiliary devices (FIG. 1). The power controller 62 is communicatively connected to the controller 12, or is otherwise communicating with one or more controllers in the control system 11, in order to control power consumption by such auxiliary devices. For example, the power controller 62 may be configured to communicate with one or more power monitoring or other control devices via CAN bus or LIN bus, and to then control operation of the auxiliary device and/or power delivery to the auxiliary device according to received instructions. For instance, the system may be configured to reduce power delivery to the device(s) 60, or to selectively turn off the auxiliary device(s) 60 by turning on or off power delivery to the device(s) 60 associated with the power controller 62 based on the engaged power control mode, such as when the time control mode is engaged to enable propelling the marine vessel for the user-set time. For instance, the power controller 62 may be configured to instruct power-down of the auxiliary device or to otherwise cut power thereto to turn off one or more auxiliary devices 60. Alternatively or additionally, the power controller 62 for one or a set of auxiliary devices may include a battery switch controlling power thereto. The control system 11 may thus include digital switching system configured to control power to the various auxiliary devices, such as a CZone Control and Monitoring system by Power Products, LLC of Menomonee Falls, Wisconsin Other examples of power control arrangements are further exemplified and described at U.S. application Ser. Nos. 17/009,412 and 16/923,866, which are each incorporated herein by reference in its entirety.

The control system 11 may be configured to select certain auxiliary device(s) 60 that get turned off or otherwise controlled to reduce or eliminate power consumption by those device(s). For example, the controller 12 may be configured with a list of one or more auxiliary devices 60 that gets turned off for each power-limited mode, including the distance control mode, time control mode, and the like. Each power mode, for example, may be associated with one or more lists of auxiliary device(s) 60 that gets turned off, and similarly differing lists may be associated with various battery charge levels and/or with various required battery power and/or required motor power values. For example, the system 11 may be configured to turn off certain non-essential auxiliary devices that are not essential to the operation of the propulsion system when the battery charge level reaches a low threshold and/or when one of the battery power required or non-motor power consumption values reach a high threshold. For example, those devices that are not important for optimized vessel operation, such as entertainment devices or other accessories, or non-essential devices that draw signification power, such as climate control devices and water heaters, may be automatically turned off by the control system or the user interface display may be controlled to instruct a user to turn off one or more of such devices.

Figure 4:
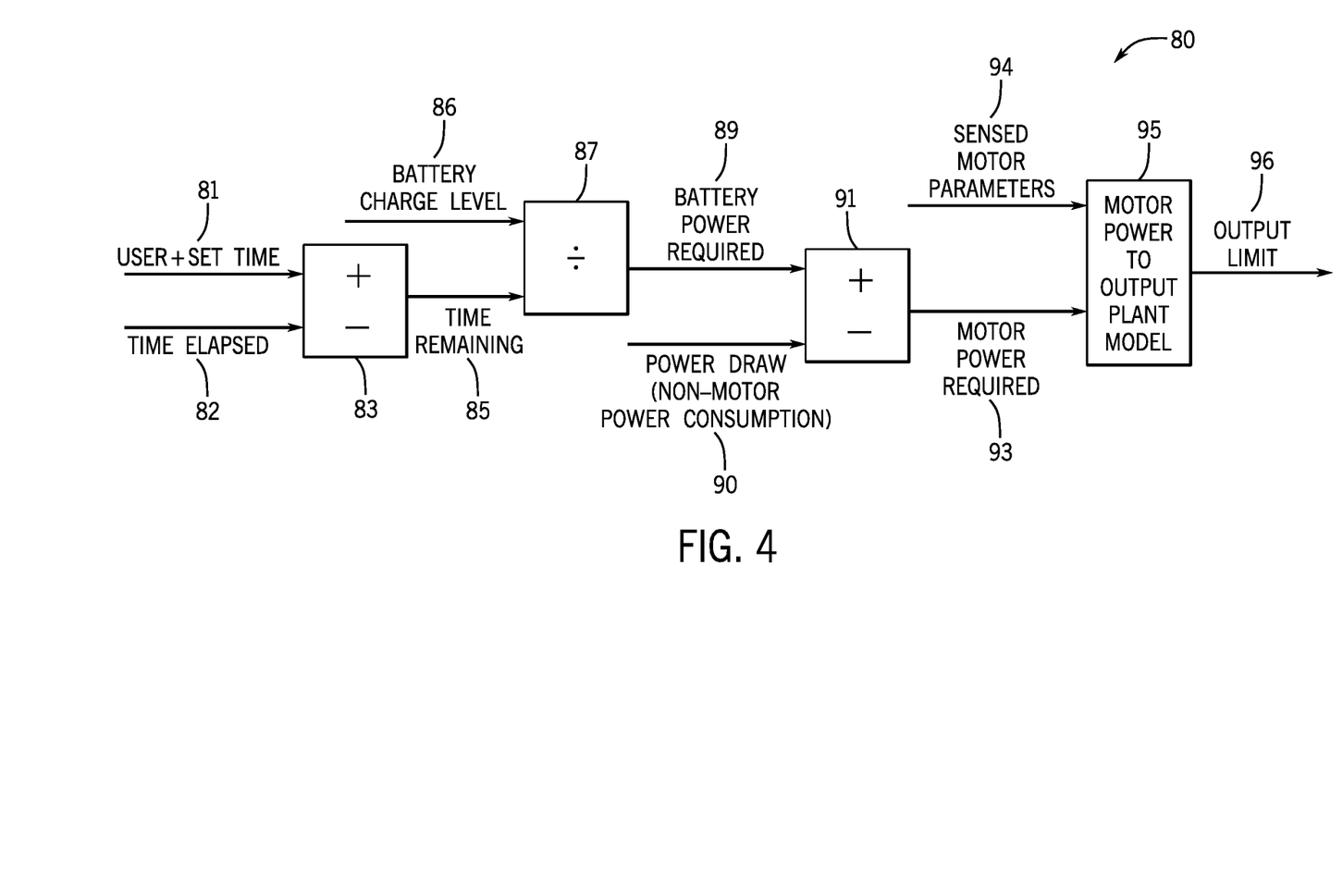
FIG. 4 is a control diagram illustrating an exemplary method for controlling an electric marine propulsion system in accordance with the present disclosure.

The control diagram at FIG. 4 illustrates an exemplary control routine executed by the control system 11 for controlling the propulsion system 2 in accordance with the present disclosure. The user-set time 81 and elapsed time 82 are received as inputs to calculation function 83, which determines the time remaining 85. As described above, the user-set time 81 may be a duration specified by the user or an end time specified by the user as a time of day. Where an end time is specified, the calculation function 83 may receive a current time of day, rather than an elapsed time, as an input for determining the time remaining 85.

A battery charge level 86 is received as an input to the calculation function 87, along with the time remaining 85, which is executed to determine the battery power required 89. The battery charge level indicates an amount of energy stored in the power storage system 16, such as in watt hours or amp hours. The battery power required 89 may be determined by dividing the battery charge level 86 by the time remaining 85. In an example where the battery charge level is provided in watt hours and the time remaining is provided in hours, the resulting battery power required 89 is determined in watts. In another example where the battery charge level is provided in amp hours, the battery power required 9 is then a value provided in amps.

Calculation function 91 is executed to determine the motor power required 93 based on the battery power required 89 and a power draw value 90. The power draw value 90 represents a total power amount currently being consumed by all devices and systems on the marine vessel except for the one or more electric motors engaged in propulsion for the marine vessel. For example, a non-motor power consumption total may be calculated as a total power draw from the power storage system 16 minus a power draw by the motor. For example, a total power draw value may be provided by the battery controller 20 monitoring the current provided by the battery in the current battery voltage. The power draw by the motor may be provided by the motor controller and/or may be calculated based on the voltage sensed by the voltage sensor 29 and the current sensed by the current sensor 28 associated with the motor 4. The non-motor power consumption, or power draw 90, may be determined by subtracting the instantaneous power draw by the motor from the instantaneous total power draw value. In some embodiments, the power draw value 90 may be a filtered value, such as a filtered series of instantaneous non-motor power draw values calculated as just described. Alternatively, the power draw value 90 may be calculated based on a filtered power draw by the motor and a filtered total power draw value.

The motor power required 93 may then be determined by subtracting a power draw 90, such as the non-motor power consumption total, from the battery power required 89. The motor power required 93 thus represents an amount of power currently available, or advisable, for use by the motor to power the motor for the remainder of the user-set time without recharging the power storage system.

Calculation function 95 is executed to determine the output limit 96 based on the motor power required 93. Various sensed motor parameters 94 may also be provided, depending on the modality of the output limit and the needs of the calculation function 95. In one embodiment, the calculation function 95 may be configured to utilize a model, such as plant model, to calculate the output limit based on the required motor power 93. Speed, Torque and Current limits are direct limit outputs that could be calculated and controlled using a model of that output for the marine vessel, such as using open loop plant model. To provide one example, the calculation function 95 may be a motor-power-to-torque plant model configured to calculate the output limit as a maximum motor torque set point based on the required motor power 93. Sensed motor speed and motor voltage may be provided as sensed motor parameters 94 to enable the plant model calculation. Namely, the calculation function 95 solves for the max torque for a given motor power limit, voltage, and speed. Similarly, the calculation function 95 may be configured to calculate the output limit as a current limit, since current=torque/kt (where the kt is a constant for a given motor). In an alternative embodiment, the calculation function 95 may be configured with a model for calculating maximum motor RPM for a given torque and sensed motor voltage.

The output limit is then utilized to limit user authority over propulsion, and thus to limit the energy utilized by the propulsion system to enable the marine vessel to travel for the user-set time on the stored battery power. As described above, the output limit 96 may be generated as any of various values that enable limiting the energy utilization by the motor, such as a motor torque limit, a motor speed limit, a motor current limit, a motor power limit, a vessel speed limit, or a helm demand limit, where the user authority over the foregoing parameter is limited by the maximum value dictated by the calculated output limit 96. The control system may be configured to implement closed loop control on top of the open loop output limit 96 constraint. Sensors may be configured to measure a corresponding value of the propulsion system to provide feedback, such as to a PID controller, to enable closed loop control. Alternatively, a closed loop control model may be utilized which implements the output limit 96 in determining the output command for the output limited variable.

Figure 5:
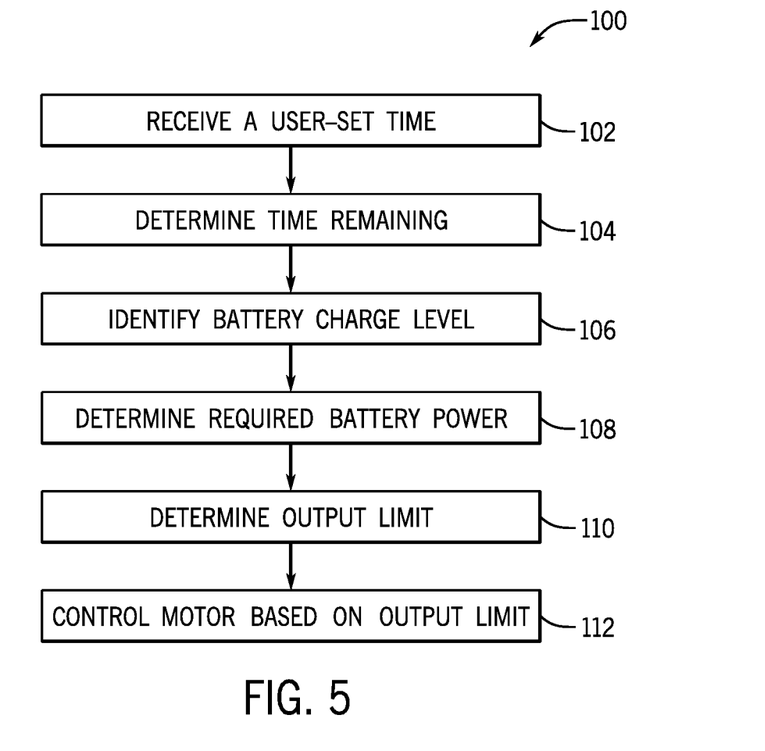
FIGS. 5-7 are flowcharts exemplifying methods, or portions thereof, for controlling an electric marine propulsion system in accordance with the present disclosure.
Figure 6:
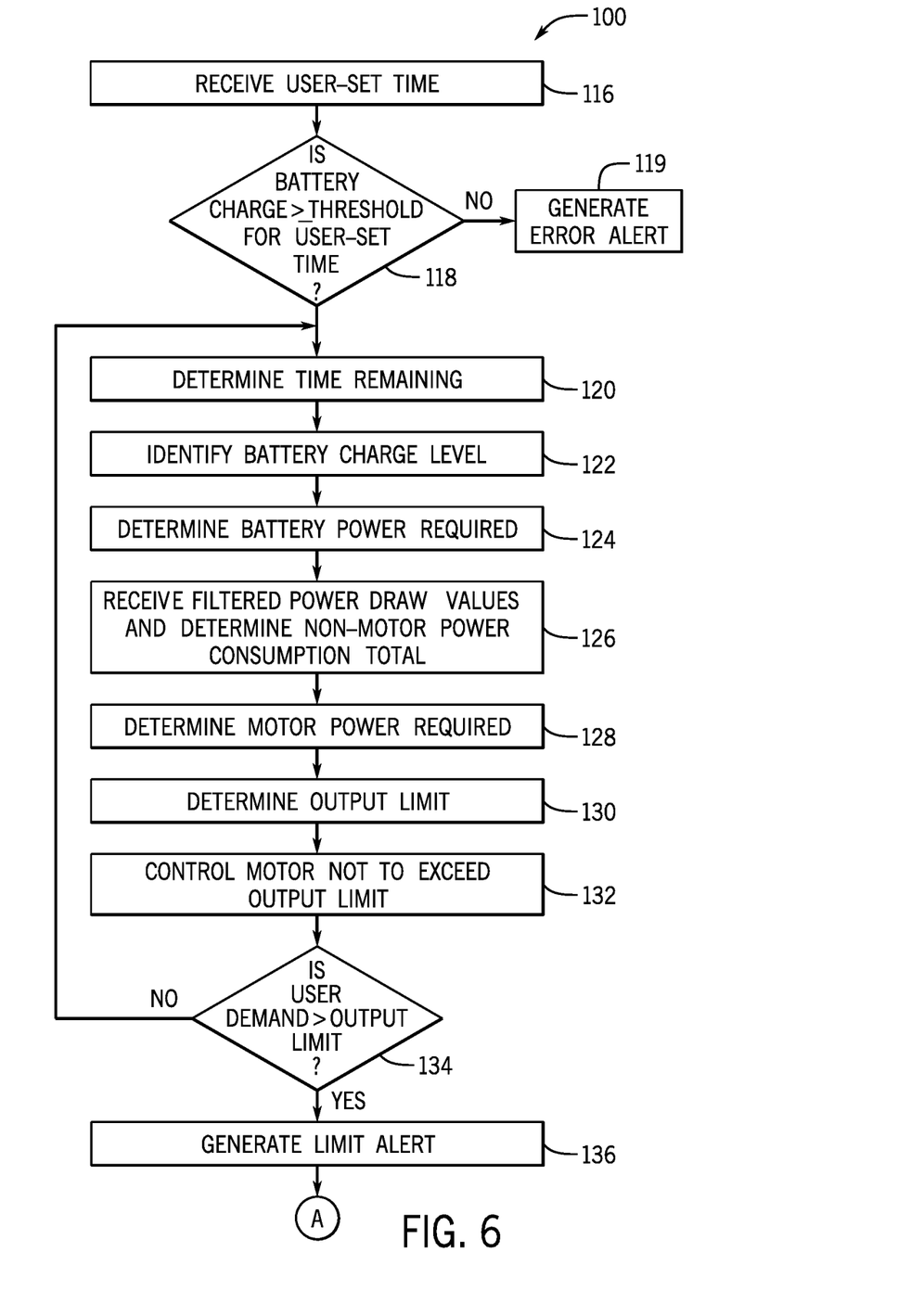
Figure 7:
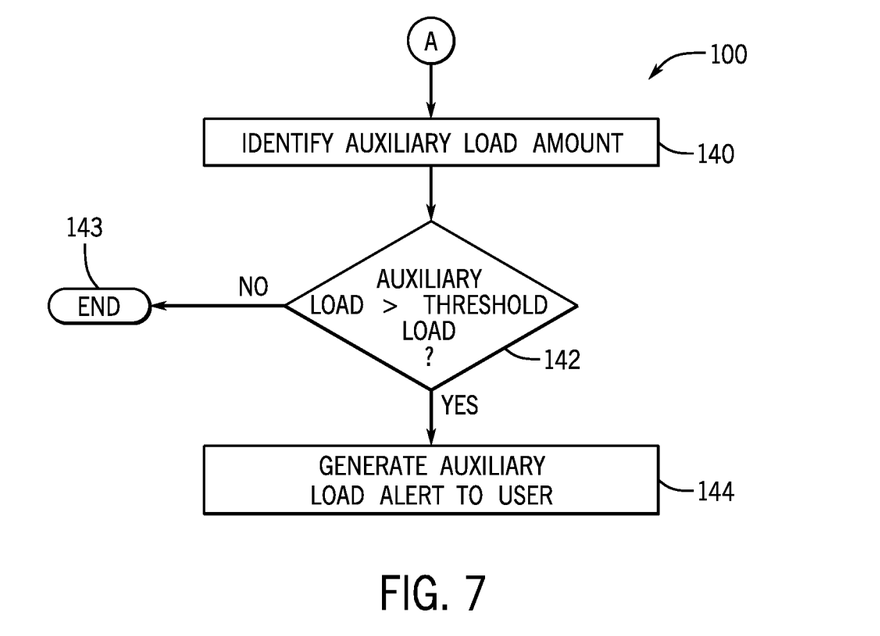

FIGS. 5-7 are flow charts illustrating exemplary methods 100, or portions thereof, for controlling electric marine propulsion to enable the marine vessel to travel the user-set time without recharging the power storage system 16 in accordance with the present disclosure. In certain embodiments, the methods 100 may be engaged or initiated upon a user selecting the time-control mode 79 via the user interface display 70, which may then prompt the user input the duration or end-time of day desired. A user-set time is received at step 102, which may be set or determined based on various user input formats as described above. A time remaining is determined at step 104, such as based on a current time or based on the countdown clock started upon implementation of the time control mode. A battery charge level is identified at step 106, such as in cooperation with the battery controller 20 and/or sensors associated with the power storage system 16.

A required battery power is then determined at step 108 based on the time remaining and the battery charge level. The required battery power represents the amount of battery power available, or advisable, to be utilized per unit time in order to enable the marine vessel to be propelled for the user-set time without recharging the battery. The output limit is then determined at step 110 based on the required battery power to enable the marine vessel to travel the user-set time without recharging the power storage system. One or more motors engaged in propulsion are then automatically controlled wo remain within the output limit, such as utilizing the output limit as a limit on user authority such that user demand less than and up to the output limit is effectuated, but user demand above the output limit is capped such that the output limit is not exceeded.

FIG. 6 depicts another embodiment of a method 100 of controlling an electric marine propulsion system 2 to enable the marine vessel to travel a user-set time without recharging the power storage system 16. A user-set time is received at step 116. Prior to initiating the time control automation based on the user-set time, a threshold check may be preformed to determine whether sufficient battery charge remains to travel the user-set time under reasonable constraints and conditions. In the depicted example, step 118 is executed to determine whether the battery charge level is at least a threshold charge level based on the user-set time. In another example, reasonable constraints and conditions may include at least a threshold initially calculated output limit—e.g., a threshold motor torque limit, motor speed limit, motor current limit, motor power limit, vessel speed limit, or helm demand limit initially calculated. If the threshold is not met, then an error alert is generated at step 119 to notify a user that there is insufficient available remaining battery power to travel the user-desired time. So long as the remaining battery power is sufficient, then the system enters the time-control mode where output is automatically limited as necessary to enable propelling the marine vessel for the user-set time period.

In the depicted example, step 120 is executed to determine the time remaining. The battery charge level is then identified, along with a filtered total power draw at step 122. The required battery power is determined at step 124. Step 126 is executed determine a non-motor power consumption total representing a total power draw from the power storage system minus a power draw by the motor. The filtered total power draw may be a filtered total power draw value representing the power draw from the power storage system 16 over a period of time. For example, the filtered total power draw value may be generated by a first order filter configured to filter a predetermined number of total power draw values provided by the battery controller 20. The filtered power draw values may further include filtered motor power draw, such as a first order filtered value of a predetermined number of motor power values.

The required motor power is then determined at step 128 based on the non-motor power consumption and the required battery power. The output limit is then determined at step 130 based on the required motor power. The motor is then automatically controlled at step 132 so as not to exceed the output limit.

In certain embodiments, the system may be configured to determine whether the user demand is being effectuated and to alert the user when output limits are being implemented such that the motor output is less than the user demands. In the example at FIG. 6, step 134 is executed to determine whether the user demand exceeds the output limit. If not, then no alert is necessary. If the user demand does exceed the output limit, then the limit alert is generated at step 136 to advise the user that the motor output does not match the demanded output due to the constraints of the time control mode.

In certain embodiments, the system may be further configured to monitor an auxiliary load amount by one or more auxiliary devices 60 and to alert a user and/or automatically control power to the auxiliary devices to limit the auxiliary load and limit power draw from the battery. In the example at FIG. 7, when the user demanded output exceeds the output limit, the control system may be configured to execute steps to alleviate the auxiliary load amount. An auxiliary load amount is identified at step 140. The auxiliary load amount is compared to a load threshold at step 142. For example, the load threshold may be determined to represent a minimum power draw needed for operating certain auxiliary devices on the marine vessel. The threshold load may also be an adjustable amount determined based on various factors such as a difference between the user demand and the output limit and/or based on the battery charge level 86. For example, the threshold load may be decreased as the demanded output further exceeds the output limit and/or as the battery charge level drops below a threshold low charge level. If the auxiliary load does not exceed the threshold, then no action is taken at step 143. If the auxiliary load exceeds a threshold load at step 142 then an auxiliary load alert is generated to the user at step 144. For example, the auxiliary load alert may be generated on the user interface 35 to advise the user to turn off high load devices, such as climate control systems and/or entertainment systems, that are not required or involved in propulsion control, guidance, navigation, etc. Alternatively or additionally, one or more auxiliary devices may be automatically turned off or operated in reduced power-consumption mode utilizing the power controller 62, as described above.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling an electric marine propulsion system configured to propel a marine vessel, the method comprising:
   receiving a user-set time;
   determining a time remaining based on the user-set time;
   identifying a battery charge level of a power storage system on the marine vessel;
   determining a required battery power based on the time remaining and the battery charge level;
   determining an output limit based on the required battery power to enable propelling the marine vessel for the user-set time without recharging the power storage system; and
   automatically controlling the propulsion system so as not to exceed the output limit.

2. The method of claim 1, wherein the output limit includes a maximum motor torque or a maximum motor RPM for an electric motor in the propulsion system, and wherein controlling the propulsion system includes controlling the electric motor so as not to exceed the maximum motor torque or the maximum motor RPM.

3. The method of claim 1, wherein the output limit includes a maximum motor current or a maximum motor power consumed by an electric motor in the propulsion system, and wherein controlling the propulsion system includes controlling the electric motor so as not to exceed the maximum motor current or the maximum motor power.

4. The method of claim 1, wherein the output limit includes a maximum vessel speed, wherein controlling the propulsion system includes controlling an electric motor in the propulsion system such that a current vessel speed does not exceed the maximum vessel speed.

5. The method of claim 1, wherein the output limit includes a maximum helm demand, and wherein controlling the propulsion system so as not to exceed the output limit includes limiting a demand instruction to the maximum helm demand.

6. The method of claim 1, further comprising receiving a non-motor power consumption total representing a total power draw from the power storage system minus a power draw by a motor of the propulsion system;
   wherein determining the output limit includes determining a required motor power based on the non-motor power consumption total.

7. The method of claim 6, wherein the output limit is calculated based on the required motor power.

8. The method of claim 7, wherein a plant model is utilized to calculate the output limit based on the required motor power.

9. The method of claim 8, wherein the plant model is a motor-power-to-torque plant model configured to calculate the output limit as a maximum motor torque based on the required motor power.

10. The method of claim 1, further comprising receiving a user input to engage a time control mode prior to determining the output limit.

11. The method of claim 10, further comprising determining a threshold battery charge level based on the user-set time, and only engaging the time control mode if the required battery power is greater than the threshold battery charge level.

12. The method of claim 11, displaying an error alert on a user interface display if the required battery power is less than the threshold battery charge level.

13. An electric marine propulsion system configured to propel a marine vessel, the system comprising:
a power storage system;
at least one electric motor powered by the power storage system and configured to rotate a propulsor to propel the marine vessel;
a control system configured to:
receive a user-set time;
determine a time remaining based on the user-set time;
identify a battery charge level of a power storage system on the marine vessel;
determine a required battery power based on the time remaining and the battery charge level;
determine an output limit based on the required battery power to enable propelling the marine vessel for the user-set time without recharging the power storage system; and
automatically control the at least one electric motor so as not to exceed the output limit.

14. The system of claim 13, wherein the control system is further configured to require a user input to engage a time control mode prior to determining the output limit.

15. The system of claim 13, wherein the output limit includes at least one of a maximum motor RPM of the at least one electric motor or a maximum vessel speed.

16. The system of claim 15, wherein system further includes a user interface display and the control system is further configured to display the output limit on the user interface display.

17. The system of claim 13, wherein the output limit includes a maximum motor RPM, a maximum motor torque, a maximum motor current, and/or a maximum motor power.

18. The system of claim 13, wherein automatically controlling the electric motor so as not to exceed the output limit includes limiting a demand instruction based on a maximum helm demand.

19. The system of claim 13, wherein the control system is further configured to determine a required motor power based on a non-motor power consumption total representing a total power draw from the power storage system minus a power draw by the at least one electric motor, and to calculate the output limit based on the required motor power.

20. The system of claim 19, wherein the control system is further configured to utilize a plant model to calculate the output limit based on the required motor power.

21. The system of claim 20, wherein the plant model is a motor-power-to-torque plant model configured to calculate the output limit as a maximum motor torque based on the required motor power.

22. The system of claim 13, wherein the control system is further configured to display a time error alert on a user interface display if the required battery power is less than a threshold battery power.

* * * * *